Oct. 6, 1931.  W. J. F. FORWARD ET AL  1,825,722
HYDRAULICALLY DRIVEN LATHE FOR CAR WHEEL AXLES AND THE LIKE
Filed Sept. 15, 1927   4 Sheets-Sheet 1
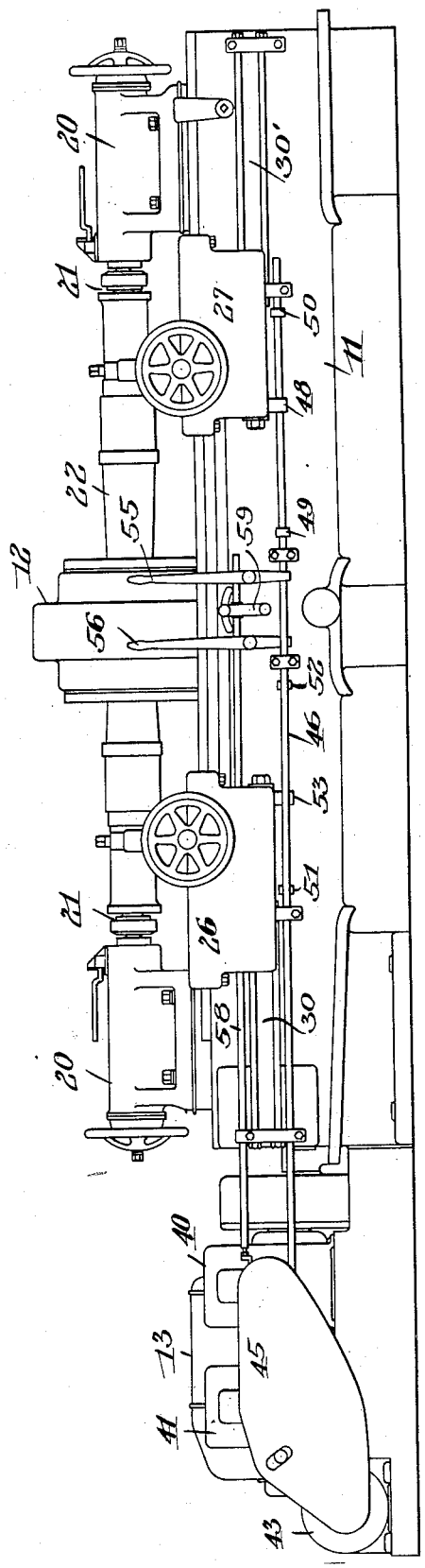
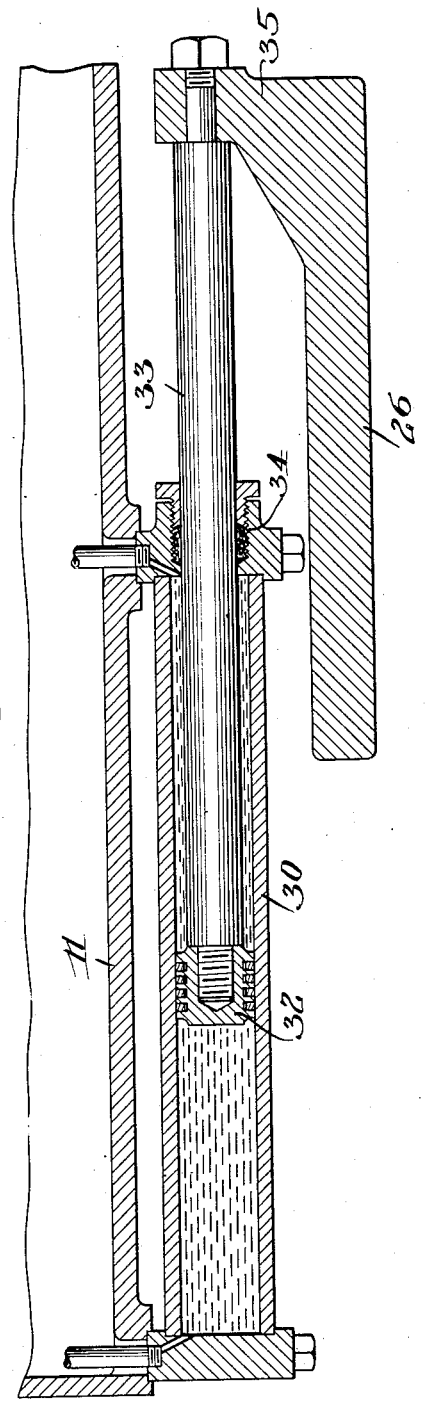
INVENTORS
Worthy J. F. Forward
BY Sherman A. Harding
Harold L. Stonebraker
their ATTORNEY

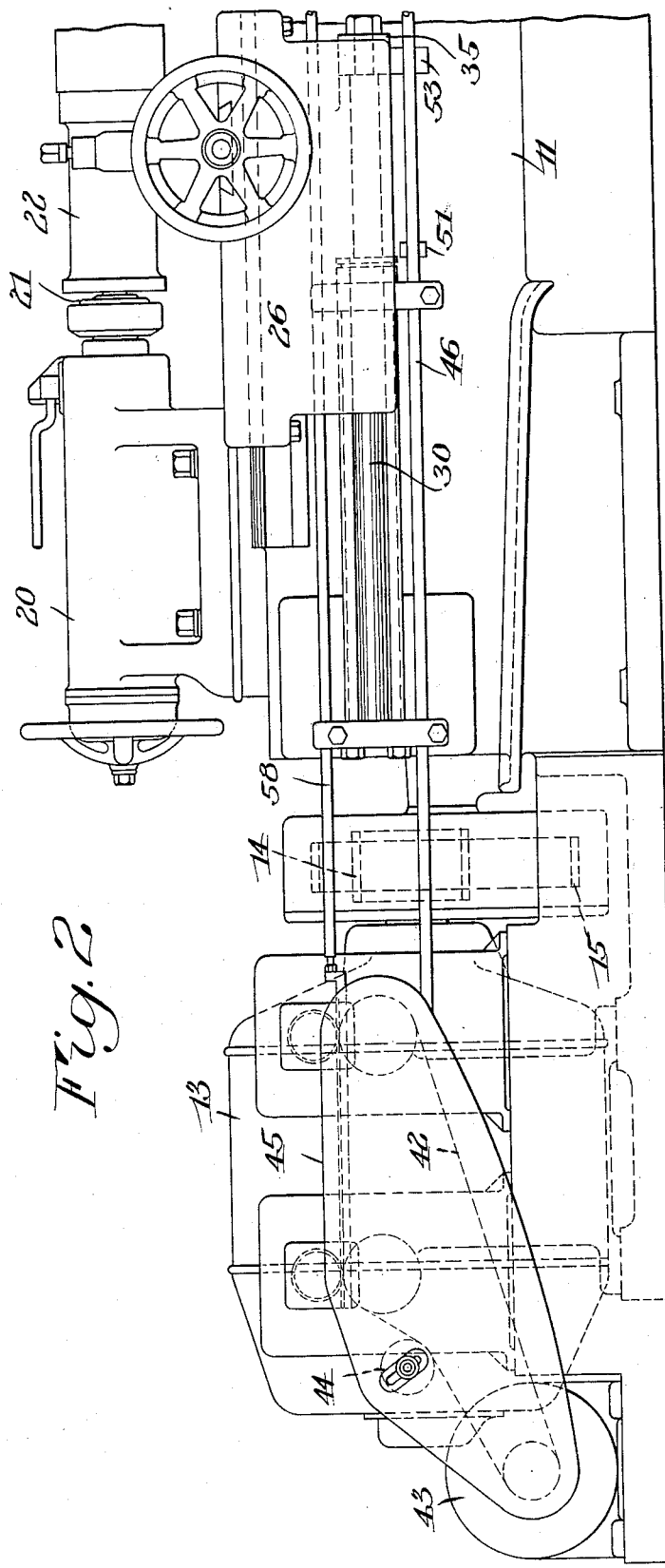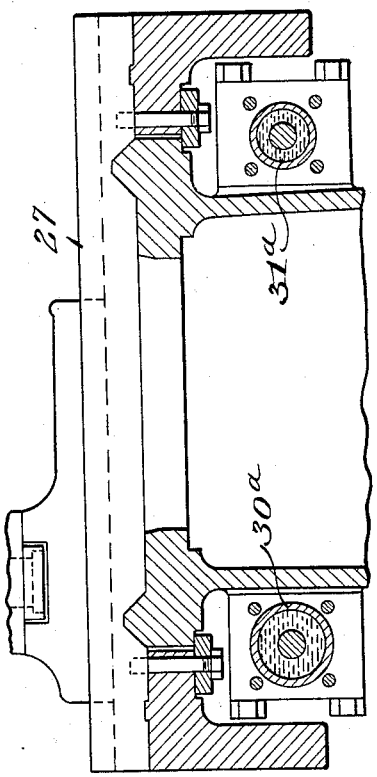

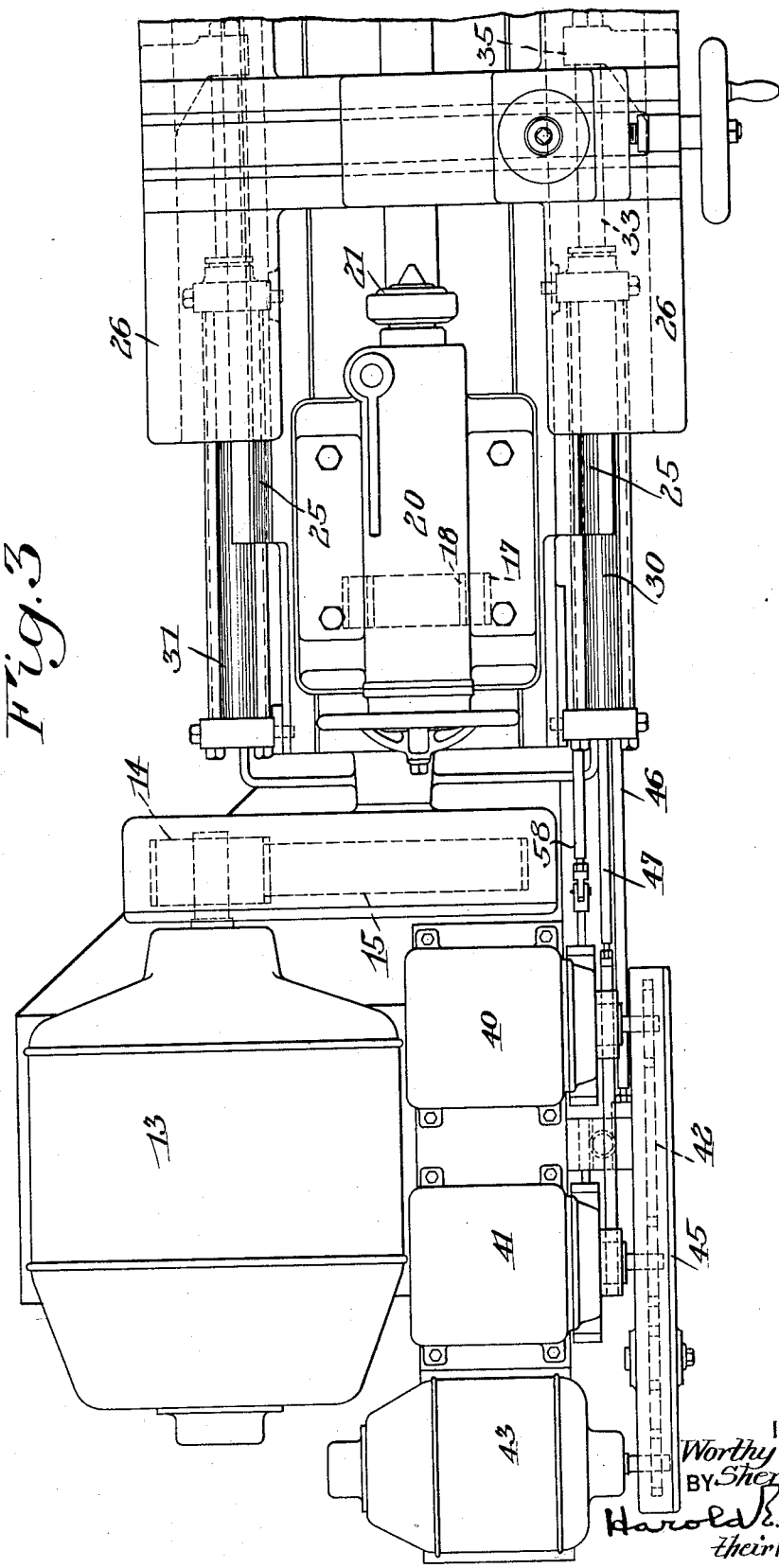

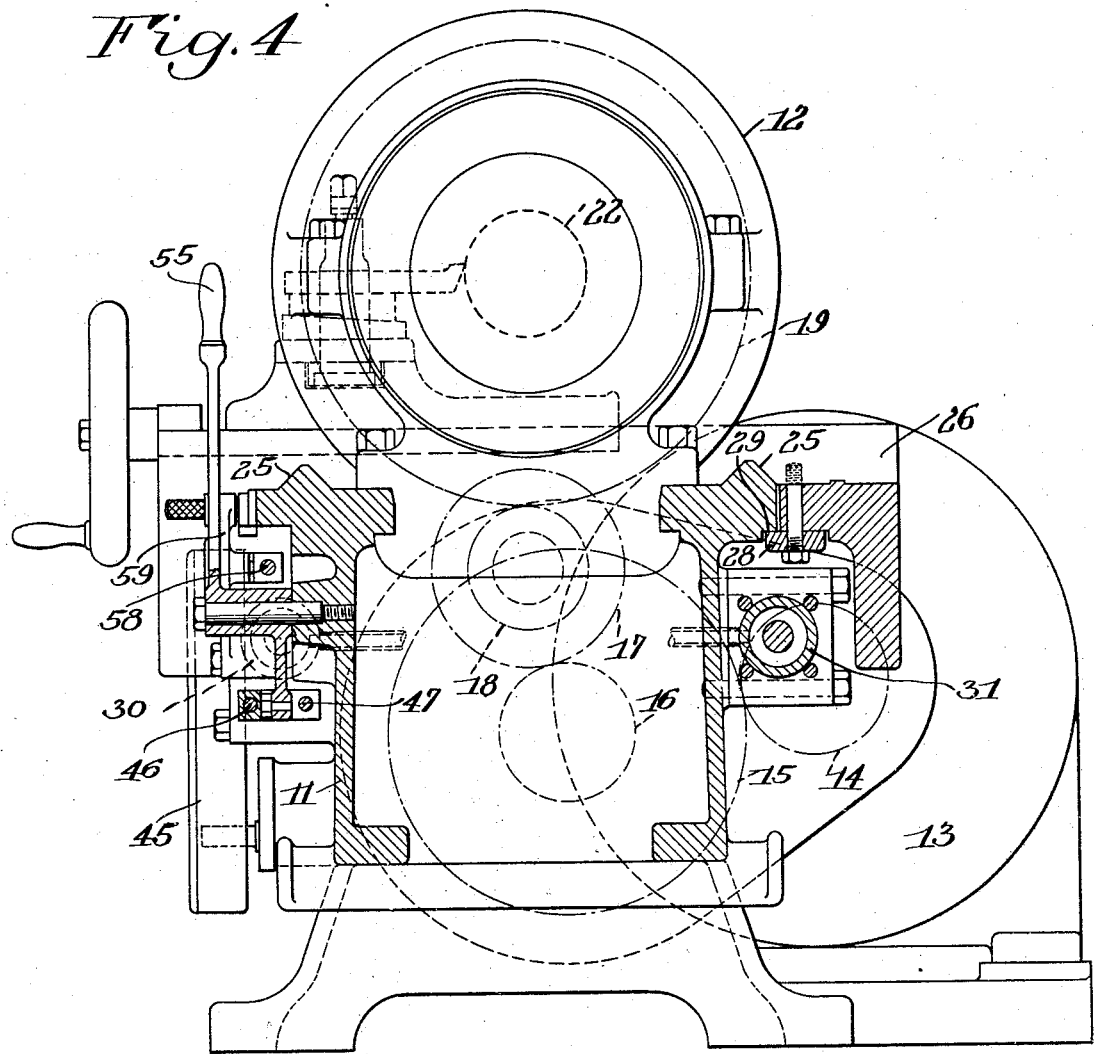

Patented Oct. 6, 1931

1,825,722

UNITED STATES PATENT OFFICE

WORTHY J. F. FORWARD AND SHERMAN A. HARDING, OF ROCHESTER, NEW YORK, ASSIGNORS TO CONSOLIDATED MACHINE TOOL CORPORATION OF AMERICA, OF ROCHESTER, NEW YORK, A CORPORATION OF DELAWARE

HYDRAULICALLY DRIVEN LATHE FOR CAR WHEEL AXLES AND THE LIKE

Application filed September 15, 1927. Serial No. 219,743.

This invention relates to a lathe, and has for its principal object to provide a hydraulic drive that is more practical, efficient, and flexible in its control of the tool carrier than any lathe tool carrier drives heretofore known.

Another object of the invention is to provide a hydraulic driving mechanism for the tool carrier which is so arranged that undue strain is prevented in case part of the mechanism should become jammed.

A further object is to provide a plurality of hydraulic driving means for moving the same tool carrier, which driving means are so placed and proportioned that undue twisting strain on the gibs and guideways of the tool carrier is avoided.

Still another object is to provide a hydraulic drive for the tool carrier which may be adjusted quickly and easily to any desired rate of travel within reasonable limits.

A still further object of the invention is to provide a double acting hydraulic drive for the tool carrier of a lathe so that the tool carrier may be returned to initial position as well as fed forward by power means, no hand movement of the tool carrier being necessary.

An additional object is to provide a main driving motor for driving the lathe and a supplemental motor for controlling the hydraulic drive to the tool carrier independently of the main motor.

Another object of the invention is to provide automatic control mechanism for the hydraulic feeding means, so that the travel of the tool carrier will be stopped automatically when it reaches a predetermined point.

A further object is to provide a lathe with a plurality of tool carriers each movable independently of the other by hydraulic means.

Still another object is to provide conveniently accessible controlling means for governing the hydraulically operated movements of the plurality of tool carriers from a single point.

With these and other ends in view, the invention comprises the structure and combination of parts which will appear more clearly from the following description when read in conjunction with the accompanying drawings, the novel features being pointed out in the claims following the description.

In the drawings:

Figure 1 is a front elevation of a lathe, showing one possible embodiment of the invention applied thereto;

Fig. 2 is an enlarged elevation of the parts shown at the left hand end of Fig. 1, illustrating the mechanism in greater detail;

Fig. 3 is a plan of the parts shown in Fig. 2;

Fig. 4 is a sectional view taken approximately centrally through the lathe;

Fig. 5 is a view showing the arrangement of the control handles;

Fig. 6 is a longitudinal section through one of the hydraulic cylinders for moving the tool carrier, and Fig. 7 is a fragmentary cross section illustrating the use of hydraulic cylinders of different sizes.

The embodiment of the invention illustrated in the drawings is shown applied to a lathe of the kind commonly known as an axle lathe, designed especially for working upon railway axles. Obviously, however, the invention is not limited in its application to such a lathe, and it could be applied equally well to lathes of many other types.

The lathe shown in the drawings comprises a bed plate 11, suitably supported. This lathe is of the center drive type, and has a housing 12 containing a driving head intended to grip the axle near its center and to rotate it. This driving head may be driven from a main driving motor, such as 13, in any suitable way, for example through the train of gears 14, 15, 16, 17, 18, and 19, shown in Fig. 4. Near each end of the lathe is a tail stock 20 containing a lathe center 21 of any suitable construction. The work to be finished such as the axle 22, is supported between the centers 21 and is gripped and rotated by the driving head within the housing 12.

Mounted upon suitable guideways 25 is a plurality of tool carriers 26 and 27, in this case two being shown, one on each side of the driving head, so that both ends of the axle may be worked upon at once. Each of these tool carriers may have a conventional tool post adapted to hold a suitable tool. The tool carriers may be provided with gibs 28 underlying guideways 29 so as to hold the tool carriers down firmly and to prevent them from being elevated accidentally off of the guideways 25.

According to the present invention, hydraulic means is employed for driving the tool carriers. Such driving means has great advantages over the conventional rack or screw driving means heretofore used on lathes, as it is much more flexible and can be adjusted to perform satisfactorily under more widely varying conditions of service.

The details of the hydraulic drive might be of many different forms. One possible form of drive illustrated in the drawings comprises the hydraulic cylinders 30 and 31, suitably fastened to the bed plate of the lathe on opposite sides of the machine, for moving the tool carrier 26, and a similar pair of cylinders 30' and 31' near the other end of the lathe, for moving the other tool carrier 27.

The construction of the cylinders is shown in detail in Fig. 6. A piston 32 in each cylinder is attached to a piston rod 33 extending into the cylinder through a suitable gland or stuffing box 34. This piston rod preferably has a substantial cross sectional area, which may be, for instance, approximately one-half the area of the cylinder. The outer end of the piston rod is secured to an offset lug or bracket 35 on a depending flange forming part of the tool carrier. Thus the motion of the piston, produced by forcing oil or other suitable liquid into the cylinder, is transmitted through the piston rod to the tool carrier, so as to drive the latter and move the tool longitudinally along the axle or other work being turned on the lathe.

One pair of cylinders is preferably pointed in the opposite direction from the other pair, so that the piston rods in each case extend through the ends of the cylinders nearest the center of the machine. In the normal operation of the lathe, the tool when making a cut will be moved toward the center of the machine, and will then be moved back to its initial position before commencing the next cut.

The two cylinders of each pair are not necessarily of the same diameter, but are preferably designed so that each of them will transmit the required force to the tool carrier without producing any tendency to twist it or throw it out of line. Since the cutting end of the tool, when making a cut, is somewhat closer to one side of the machine than the other, the resistance offered to the feeding movement of the tool carrier will be applied at a point which is not equidistant from the two driving cylinders. If the two cylinders push equally against the tool carrier, it is obvious that there will be a tendency to twist or distort the carrier, thus causing increased friction and wear on the guideways and gibs. In order to avoid this, the sizes of the cylinders may be proportioned so that each one will furnish the power required without twisting the tool carrier.

This arrangement is illustrated in Fig. 7, in which it is seen that the cylinder 30ª, at the front or tool side of the machine, is somewhat larger than the other cylinder 31ª at the back of the lathe. By comparing Figure 7 with the position of the tool shown in the upper part of Figure 4, it will be seen that the end of the tool in contact with the work 22 is closer to the cylinder 30ª than to the cylinder 31ª, and therefore greater power is required in the cylinder 30ª. The exact proportions of the cylinders which should be used for satisfactory operation may be determined either mathematically or by experiment.

For operating the hydraulic cylinders, conventional oil pumps such as 40 and 41 may be employed, these pumps being driven in any suitable manner, such as by the belt 42, from the supplementary motor 43. An idler pulley 44 may be used to adjust the tension of the belt, and the whole drive may be encased in a housing 45.

Suitable piping extends from the pumps to the cylinders, this piping not being shown in the drawings since it is of the conventional type. It will be understood that two pipes extend from each of the pumps to the set of cylinders controlled by that pump, one of the pipes leading to one of the ends of the two cylinders in each pair, while the other pipe leads to the other ends of the same cylinders. Corresponding ends of the two cylinders in each pair are thus connected together, so as to carry equal fluid pressures. Thus there will be one pipe from the pump 41 to the left hand ends of the cylinders 30 and 31, and another pipe from the same pump to the right hand ends of the same cylinders 30 and 31. Also there will be similar pipes from the pump 40 to the right and left hand ends of the other pair of cylinders 30' and 31'. By using separate pumps for the two pairs of cylinders, each of the tool carriers may thus be moved or stopped independently of the other.

Mechanism of various forms may be employed for controlling the operation of the pumps. Preferably automatic stop means is provided so that the tool carriers will be stopped at any predetermined point. Such mechanism may include control members in the nature of rods 46 and 47 extending from the pumps 40 and 41 along the machine, as shown in Fig. 1. The rod 46 is connected at its left hand end to the control of the pump 40, and extends rightwardly to the tool carrier 27. It is suitably supported throughout its length in brackets which allow it to move longitudinally. A lug 48 on the tool carrier 27 lies adjacent to this control rod, and as the tool carrier moves back and forth, this lug may come into contact with adjustable stops 49 and 50 positioned at predetermined points along the rod. When using the machine, these stops 49 and 50 will be so placed that they will be moved by contact with the lug 48 when the tool carrier reaches the end of its desired operative stroke. Thus the tool carrier will automatically operate the control of the pump which drives it, and will stop itself at any point determined by the operator of the machine. Similar adjustable stops 51 and 52 are provided on the other control rod 47, and are moved by the lug 53 on the other tool carrier 26. This control rod 47 is connected to the control of the pump 41 which operates the cylinders 30 and 31 for the tool carrier 26, and thus this tool carrier, like the other one, may be stopped automatically at any predetermined point.

In order to control the pumps manually, a handle 55 may be fixed near the center of the machine, so arranged that it will move the control member 46, and another handle 56 may similarly control the member 47. The various positions which these handles may have are illustrated in Fig. 5, from which it will be seen that when a control handle is in the center of its range of movement, the pump is in neutral position and no driving action of the tool carrier in either direction takes place. When the handle is moved slightly to either side of its neutral position, the pump is thrown in to the feed the tool carrier in one direction or the other, the direction of feed depending on which way the handle is thrown. During the feeding operation, it is to be understood that oil is forced under high pressure into one end or the other of the hydraulic cylinders, thus moving the piston and the tool carrier in the desired direction. Usually the feeding movement will be toward the center of the machine, as mentioned above.

If the handle be thrown to the extreme limit of its motion in either direction, a rapid traverse movement of the tool carrier will take place. This movement is much more rapid than the feeding operation, and is not used when the tool is cutting, but only when positioning the tool carrier ready for the next cut. If the tool carrier is being moved outwardly, away from the center of the machine, the rapid traverse is accomplished by pumping oil into the ends of the cylinders nearest the center of the machine, these being the ends through which the piston rods extend. As the piston rod has a considerable cross-sectional area (approximately half of the area of the cylinder), it will be seen that only half as much fluid is required to move the piston a given distance if forced into this end of the cylinder, as would be needed if forced into the opposite end. Therefore a comparatively rapid movement of the tool carrier may be produced.

If the rapid traverse is in the opposite direction, or toward the center of the machine, it is then accomplished by forcing oil into the ends of the cylinders farthest from the center of the machine, at the same time connecting the two ends of the cylinders together so that as the piston moves toward the center of the machine, it will force fluid out of the end of the cylinder through which the piston rod passes, and into the other end. This connection between the two ends of the cylinders is accomplished entirely within the pump. Due to this connection, it will be seen that the fluid is under equal unit pressure on both sides of the piston. Because the piston rod has a substantial area, there is less effective piston surface exposed to the fluid on one side of the piston than on the other, and the total pressure against the side of the piston to which the rod is connected will be considerably less than the total pressure against the other side of the piston, even though the unit pressures are equal. Hence the piston will move toward the end of the cylinder through which the piston rod passes, and in so doing will force the fluid out of this end, through the piping connections, and into the other end, thus helping to fill up the other end of the cylinder.

On account of this differential action, the amount of fluid which must be forced into the cylinder by the pump is only approximately half as great as would be necessary if the two ends of the cylinder were not connected together in the manner above described. Therefore the rapid traverse movement of the tool carrier is at the same rate of speed in either direction, although the feeding movement, for a given speed of the pump, is obviously twice as fast in a direction away from the center of the machine as when moving toward the center of the machine.

Adjusting means is provided, however, to vary the rate of the pump, so that the tool carriers may be moved at any desired speed within reasonable limits. By proper use of this adjusting means, it is possible to obtain equal velocity of the tool carriers in either direction, during the feeding operation. This adjusting means includes a control member in the nature of a rod 58 extending from the pumps to approximately the center of the machine, being there provided with a handle 59 by means of which it may be moved slightly in either direction and held in desired position. This rod 58 controls the rate of both pumps, and thus the rate of movement of both tool carriers may be controlled by this common means 58, 59, while the character of movement of each tool carrier, such as feed in one direction or the other, or rapid traverse in one direction or the other, is controlled separately for each tool carrier by the handles 55 and 56.

The interior construction of the pumps 40 and 41 is of well known form, and therefore is not illustrated in this application. It should be understood that the control members 46, 47, and 58 are attached to the usual control mechanisms with which the pumps are provided, and manipulation of the control members in the way above described will cause the pumps to act in the manner indicated.

Further flexibility in addition to that provided by the control 58, 59, is secured by the use of the supplemental motor 43 for driving the pumps, instead of driving them from the main motor 13. Suitable speed controls may be provided for the two motors, so that one may be run fast and the other slow, thus obtaining additional variation in the rate of travel of the tool carriers with respect to the rotations of the driving head of the lathe, which would not be possible if only one motor were employed.

The oil pumps 40 and 41 preferably are provided with relief valves, which may be adjusted to any desired pressure. If a tool carrier becomes stuck or jammed in any manner, the fluid pressure in the cylinders will rise until the relief valve opens, and further increase in pressure will then be prevented. Thus straining of the mechanism or other damage of the parts is avoided. This is an important safety feature obtainable easily with a hydraulic drive such as this, but which can not be secured satisfactorily when using the conventional screw or rack and pinion drives.

It will now be seen that an improved lathe has been disclosed, which has many advantages over the constructions heretofore known. By the use of hydraulic feeding means for the tool carriers, great flexibility of operation is secured. Each tool carrier may be moved independently of the other, either in a feeding or a rapid traverse operation, and each has its own independent controls for stopping itself automatically upon reaching a predetermined point. Wide range in the speeds of the tool carriers relative to the rotations of the work may be obtained by varying the relative speeds of the two motors, in addition to using the speed control on the pumps.

Smooth operation of each tool carrier is obtained by the use of a plurality of hydraulic cylinders, while wear and friction are greatly reduced by proportioning the diameters of the cylinders in the way above described. Furthermore, breakage of parts is prevented by providing the relief valves above mentioned.

While one embodiment of the invention has been disclosed, it is to be understood that the inventive idea may be carried out in a number of ways. This application is therefore not to be limited to the precise details shown, but is intended to cover all modifications thereof falling within the spirit of the invention or the scope of the appended claims.

We claim:—

1. In a lathe, the combination with work supporting and rotating means, a plurality of reciprocable tool carriers, of hydraulic means including a separate pump for moving each tool carrier, separate control means for controlling the character of action of each pump independently of the others, means actuated by the reciprocation of the tool carriers for actuating said separate control means, and common control means for controlling the rate of action of all of said pumps simultaneously.

2. In a lathe, the combination with work supporting and rotating means, a plurality of reciprocable tool carriers, of hydraulic means including a separate pump for moving each tool carrier, means actuated by the reciprocation of said tool carriers for controlling the corresponding hydraulic means, a main driving motor for driving said lathe, and a supplemental motor for simultaneously driving all of said pumps independently of said main motor.

3. A hydraulically driven lathe for car wheel axles and the like comprising work supporting and rotating means, a reciprocable tool carrier having a tool stationarily mounted thereon and extending transversely of the line of travel of the tool carrier, of hydraulic means for moving the tool carrier, said hydraulic means including a plurality of hydraulic cylinders located on opposite sides of and at unequal distances from the cutting edge of the tool, and pistons movable in said cylinders and connected to the tool carrier, the cylinder and piston nearest to the cutting edge of the tool being formed to transmit greater power to the tool carrier than the cylinder and piston which is farthest from said cutting edge.

4. A hydraulically driven lathe for car wheel axles and the like including a bed having vertical side walls and longitudinal ways, work supporting and rotating means, a reciprocable tool carrier movable on said ways having a tool stationarily mounted thereon and extending transversely of the line of travel of the tool carrier, of hydraulic cylinders fixedly mounted against said side walls of the bed and located beneath the aforementioned ways with the longitudinal axes of the cylinders approximately in the same vertical plane with the outer edges of said ways, and pistons movable in said cylinders and fixedly connected to the tool carrier at opposite points thereof.

5. A hydraulically driven lathe for car wheel axles and the like including a bed having vertical side walls and longitudinal ways, work supporting and rotating means, a reciprocable tool carrier movable on said ways and having a tool stationarily mounted thereon and extending transversely of the line of travel of the tool carrier, hydraulic cylinders fixedly located with their longitudinal axes approximately in the same vertical planes with the outer edges of said ways and at unequal distances from the cutting edge of the tool, and pistons movable in said cylinders and fixedly connected to the tool carrier at opposite points thereof, the cylinder and piston nearest to the cutting edge of the tool being formed to transmit greater power to the tool carrier than the cylinder and piston farthest from said cutting edge.

6. A hydraulically driven lathe for car wheel axles and the like comprising a bed having vertical side walls and longitudinal ways, work supporting and rotating means, a reciprocable tool carrier movable on said ways and having a tool stationarily mounted thereon and extending transversely of the line of travel of the tool carrier, hydraulic cylinders fixedly mounted on the outside of said side walls of the bed with their longitudinal axes approximately in the same vertical planes as the outer edges of said ways and at unequal distances from the cutting edge of the tool, and pistons movable in said cylinders and fixedly connected to the tool carrier at opposite points thereof, the cylinder and piston nearest to said cutting edge being formed to transmit greater power than the cylinder and piston farthest from said cutting edge.

In witness whereof, we have hereunto signed our names.

SHERMAN A. HARDING.
WORTHY J. F. FORWARD.